(12) United States Patent
Heo et al.

(10) Patent No.: US 11,647,228 B2
(45) Date of Patent: May 9, 2023

(54) METHOD AND APPARATUS FOR ENCODING AND DECODING VIDEO SIGNAL USING TRANSFORM DOMAIN PREDICTION FOR PREDICTION UNIT PARTITION

(71) Applicant: LG ELECTRONICS INC., Seoul (KR)

(72) Inventors: Jin Heo, Seoul (KR); Sehoon Yea, Seoul (KR); Bumshik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 787 days.

(21) Appl. No.: 16/318,075

(22) PCT Filed: Jul. 15, 2016

(86) PCT No.: PCT/KR2016/007767
§ 371 (c)(1),
(2) Date: Jan. 15, 2019

(87) PCT Pub. No.: WO2018/012660
PCT Pub. Date: Jan. 18, 2018

(65) Prior Publication Data
US 2021/0289230 A1    Sep. 16, 2021

(51) Int. Cl.
*H04N 11/02* (2006.01)
*H04N 19/61* (2014.01)
(Continued)

(52) U.S. Cl.
CPC ........... *H04N 19/61* (2014.11); *H04N 19/109* (2014.11); *H04N 19/124* (2014.11);
(Continued)

(58) Field of Classification Search
CPC .... H04N 19/61; H04N 19/109; H04N 19/124; H04N 19/159; H04N 19/167; H04N 19/176; H04N 19/182; H04N 19/523
(Continued)

(56) References Cited

U.S. PATENT DOCUMENTS

| | | | |
|---|---|---|---|
| 2012/0128070 A1* | 5/2012 | Kim | H04N 19/122 375/E7.243 |
| 2013/0003824 A1* | 1/2013 | Guo | H04N 19/46 375/240.18 |

(Continued)

FOREIGN PATENT DOCUMENTS

| | | |
|---|---|---|
| KR | 1020100045007 A | 5/2010 |
| KR | 1020120009693 A | 2/2012 |
| KR | 1020160046319 A | 4/2016 |

*Primary Examiner* — Jayanti K Patel
*Assistant Examiner* — Richard B Carter
(74) *Attorney, Agent, or Firm* — Fish & Richardson P.C.

(57) ABSTRACT

The present invention provides a method for decoding a video signal including extracting an inter prediction mode of a current block from the video signal; generating two non-square prediction blocks using two motion vectors according to the inter prediction mode; performing a non-square transform on the two non-square prediction blocks to obtain two non-square prediction blocks on a frequency domain; updating the two non-square prediction blocks on the frequency domain using a correlation coefficient or a scaling coefficient; and generating a reconstruction block based on the updated non-square prediction blocks on the frequency domain and a residual block.

10 Claims, 16 Drawing Sheets

(51) Int. Cl.
*H04N 19/109* (2014.01)
*H04N 19/124* (2014.01)
*H04N 19/159* (2014.01)
*H04N 19/167* (2014.01)
*H04N 19/176* (2014.01)
*H04N 19/182* (2014.01)
*H04N 19/523* (2014.01)

(52) U.S. Cl.
CPC ......... *H04N 19/159* (2014.11); *H04N 19/167* (2014.11); *H04N 19/176* (2014.11); *H04N 19/182* (2014.11); *H04N 19/523* (2014.11)

(58) Field of Classification Search
USPC .............. 375/240.16, 240.03, 240.12, 240.13
See application file for complete search history.

(56) References Cited

U.S. PATENT DOCUMENTS

| | | | |
|---|---|---|---|
| 2013/0064294 A1* | 3/2013 | Sole Rojals | H04N 19/176 375/240.18 |
| 2013/0136175 A1* | 5/2013 | Wang | H04N 19/593 375/240.12 |
| 2014/0044166 A1 | 2/2014 | Xu et al. | |
| 2014/0376631 A1 | 12/2014 | Sato | |
| 2017/0150186 A1* | 5/2017 | Zhang | H04N 19/625 |

* cited by examiner

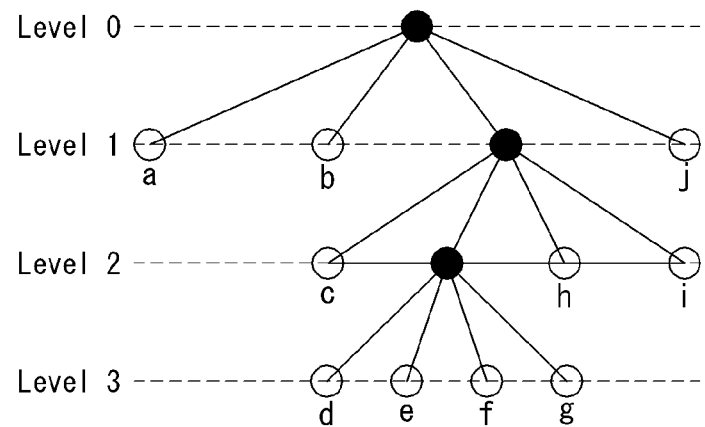
(a)
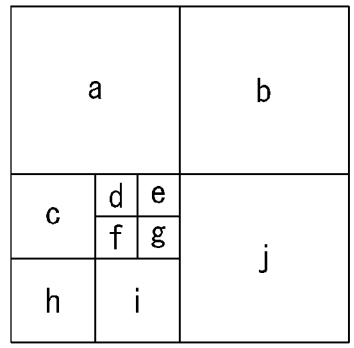
(b)
Figure 3

| | | |
|---|---|---|
| | prediction_unit( x0, y0, nPbW, nPbH ) { | Descriptor |
| |   if( cu_skip_flag[ x0 ][ y0 ] ) { | |
| |     if( MaxNumMergeCand > 1 ) | |
| |       merge_idx[ x0 ][ y0 ] | ae(v) |
| |   } else { /* MODE_INTER */ | |
| |     merge_flag[ x0 ][ y0 ] | ae(v) |
| |     if( merge_flag[ x0 ][ y0 ] ) { | |
| |       if( MaxNumMergeCand > 1 ) | |
| |         merge_idx[ x0 ][ y0 ] | ae(v) |
| |     } else { | |
| |       if( slice_type == B ) | |
| |         inter_pred_idc[ x0 ][ y0 ] | ae(v) |
| |       if( inter_pred_idc[ x0 ][ y0 ] != PRED_L1 ) { | |
| |         if( num_ref_idx_l0_active_minus1 > 0 ) | |
| |           ref_idx_l0[ x0 ][ y0 ] | ae(v) |
| |         mvd_coding( x0, y0, 0 ) | |
| |         mvp_l0_flag[ x0 ][ y0 ] | ae(v) |
| |       } | |
| |       if( inter_pred_idc[ x0 ][ y0 ] != PRED_L0 ) { | |
| |         if( num_ref_idx_l1_active_minus1 > 0 ) | |
| |           ref_idx_l1[ x0 ][ y0 ] | ae(v) |
| |         if( mvd_l1_zero_flag && | |
| |           inter_pred_idc[ x0 ][ y0 ] == PRED_BI ) { | |
| |           MvdL1[ x0 ][ y0 ][ 0 ] = 0 | |
| |           MvdL1[ x0 ][ y0 ][ 1 ] = 0 | |
| |         } else | |
| |           mvd_coding( x0, y0, 1 ) | |
| |         mvp_l1_flag[ x0 ][ y0 ] | ae(v) |
| |       } | |
| S1410 |       coeff_flag[ x0 ][ y0 ] | ae(v) |
| |     } | |
| |   } | |
| | } | |

Figure 14

● Integer pixel position
■ Horizontal-half pixel position
▲ Vertical-half pixel position
✕ Horizontal vertical-half pixel position
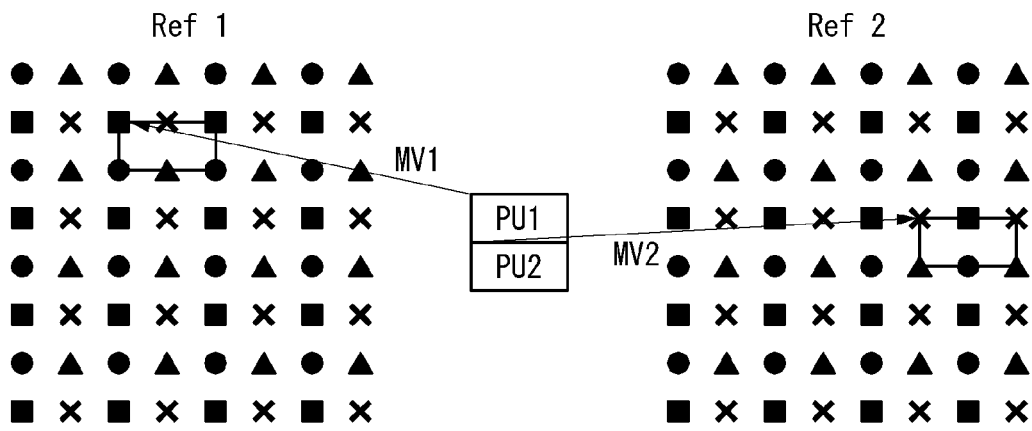
(a)
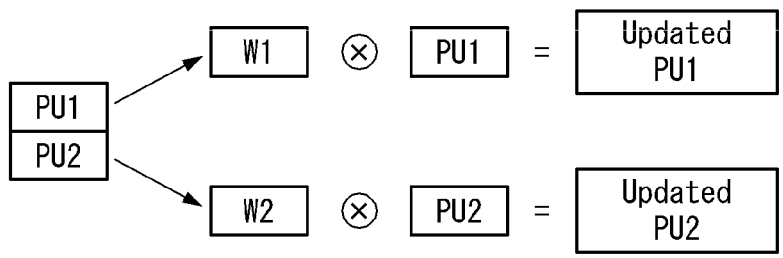
(b)
Figure 15

METHOD AND APPARATUS FOR ENCODING AND DECODING VIDEO SIGNAL USING TRANSFORM DOMAIN PREDICTION FOR PREDICTION UNIT PARTITION

CROSS-REFERENCE TO RELATED APPLICATIONS

This application is a National Stage application under 35 U.S.C. § 371 of International Application No. PCT/KR2016/007767, filed on Jul. 15, 2016, the disclosure of which is incorporated by reference in its entirety.

TECHNICAL FIELD

The present invention relates to a method and a device for encoding/decoding a video signal, and more particularly to a technology for performing a transform domain prediction in consideration of different correlations of frequency components when a prediction block is split.

More specifically, the present invention relates to a technology for performing a prediction using a correlation coefficient between a transform coefficient of an original block and a transform coefficient of a prediction block or a scaling coefficient minimizing a prediction error of a frequency component.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Accordingly, there is a need to design a new coding tool for processing more efficiently the next generation video contents, and particularly a prediction method in a frequency domain may be utilized to increase accuracy of a prediction sample.

DISCLOSURE

Technical Problem

The present invention is to propose a method for applying a correlation between frequency coefficients when a prediction block is split in a prediction process.

The present invention is to propose a method for applying a transform to each split prediction block when a prediction block is split in a prediction process.

The present invention is to propose a method for regenerating a prediction block in a frequency domain by reflecting a correlation between frequency coefficients when the prediction block is split in a prediction process.

The present invention is to propose a method for performing a transform domain prediction using two correlation coefficients or two scaling coefficients.

The present invention is to propose a method for improving coding efficiency through a prediction filter design.

The present invention is to propose a method for improving a prediction performance and quality of a reconstructed frame through a prediction filter design.

The present invention is to propose a method for generating a spatial correlation coefficient and a scaling coefficient with respect to each transform coefficient in a frequency domain.

The present invention is to propose a method for generating a correlation coefficient between transform coefficients with the same frequency component in consideration of similarity of respective frequency components in a transform block of an original image and a transform block of a prediction image.

The present invention is to propose a method for generating, for each frequency, a scaling coefficient minimizing a square error of each frequency component in a transform block of an original image and a transform block of a prediction image.

The present invention is to propose a method for calculating a correlation coefficient or a scaling coefficient per prediction mode, quantization coefficient, or sequence.

The present invention is to propose a method for applying a correlation between frequency coefficients in a prediction process.

The present invention is to propose a method for regenerating a prediction block in a frequency domain by reflecting a correlation between frequency coefficients in a prediction process.

The present invention is to propose a new encoder/decoder structure for reflecting a correlation in a frequency domain.

The present invention is to propose a method for applying a correlation between frequency coefficients in a quantization process.

The present invention is to propose a method for generating a quantization coefficient by reflecting a correlation between frequency coefficients in a quantization/dequantization process.

Technical Solution

The present invention provides a method for applying a correlation between frequency coefficients when a prediction block is split in a prediction process.

The present invention provides a method for applying a transform to each split prediction block when a prediction block is split in a prediction process.

The present invention provides a method for regenerating a prediction block in a frequency domain by reflecting a correlation between frequency coefficients when the prediction block is split in a prediction process.

The present invention provides a method for performing a transform domain prediction using two correlation coefficients or two scaling coefficients.

The present invention provides a method for improving coding efficiency through a prediction filter design.

The present invention provides a method for improving a prediction performance and quality of a reconstructed frame through a prediction filter design.

The present invention provides a method for generating a spatial correlation coefficient and a scaling coefficient with respect to each transform coefficient in a frequency domain.

The present invention provides a method for generating a correlation coefficient between transform coefficients with the same frequency component in consideration of similarity of respective frequency components in a transform block of an original image and a transform block of a prediction image.

The present invention provides a method for generating, for each frequency, a scaling coefficient minimizing a square error of each frequency component in a transform block of an original image and a transform block of a prediction image.

The present invention provides a method for calculating a correlation coefficient or a scaling coefficient per prediction mode, quantization coefficient, or sequence.

The present invention provides a method for applying a correlation between frequency coefficients in a prediction process.

The present invention provides a method for regenerating a prediction block in a frequency domain by reflecting a correlation between frequency coefficients in a prediction process.

The present invention provides a new encoder/decoder structure for reflecting a correlation in a frequency domain.

The present invention provides a method for applying a correlation between frequency coefficients in a quantization process.

The present invention provides a method for generating a quantization coefficient by reflecting a correlation between frequency coefficients in a quantization/dequantization process.

Advantageous Effects

The present invention can increase compression efficiency by reducing energy of a prediction residual signal in consideration of a correlation between frequency components of an original block and a prediction block when a still image or a video is prediction-encoded in a screen or between screens.

The present invention can also change a quantization step size per frequency by considering a correlation coefficient or a scaling coefficient considering a spatial correlation of an original image and a prediction image in a quantization process to enable a more adaptive quantization design, and thus can improve a compression performance.

The present invention can also improve a prediction performance, quality of a reconstructed frame, and coding efficiency through a prediction filter design.

DESCRIPTION OF DRAWINGS

FIG. 3 is a diagram illustrating a division structure of a coding unit according to an embodiment of the present invention.

FIG. 14 illustrates syntax for signaling a correlation coefficient or a scaling coefficient when performing a transform domain prediction, as an embodiment to which the present invention is applied.

FIG. 15 illustrates a method for generating an updated prediction block using two correlation coefficients or two scaling coefficients, as an embodiment to which the present invention is applied.

BEST MODE

Figure 1:
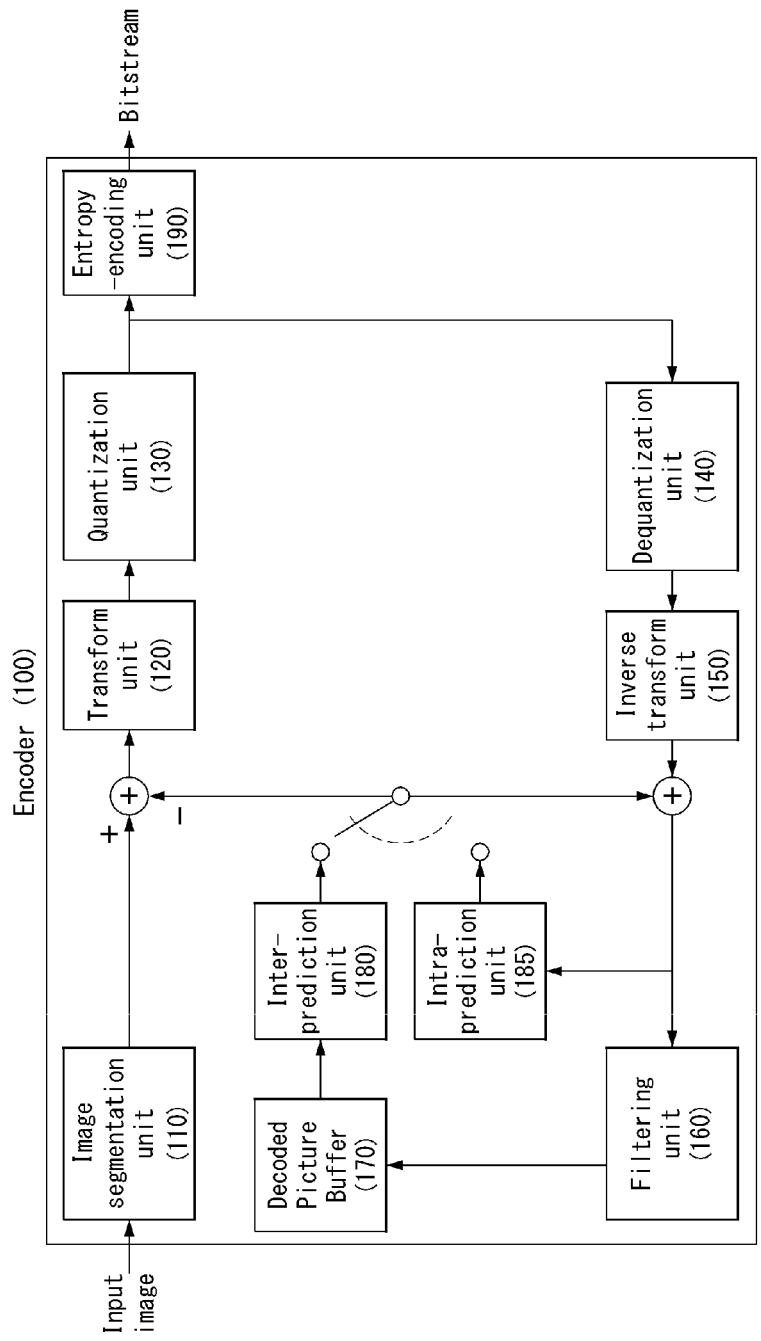
FIG. 1 is a block diagram illustrating a configuration of an encoder for encoding a video signal according to an embodiment of the present invention.

The present invention provides a method for decoding a video signal comprising extracting an inter prediction mode of a current block from the video signal; generating two non-square prediction blocks using two motion vectors according to the inter prediction mode; performing a non-square transform on the two non-square prediction blocks to obtain two non-square prediction blocks on a frequency domain; updating the two non-square prediction blocks on the frequency domain using a correlation coefficient or a scaling coefficient; and generating a reconstruction block based on the updated non-square prediction blocks on the frequency domain and a residual block.

In the present invention, the two motion vectors represent a position of a subpixel.

In the present invention, one of the two motion vectors represents a backward motion vector, and the other represents a forward motion vector. The correlation coefficient or the scaling coefficient is determined based on at least one of the position of the subpixel or directionality of a motion vector.

In the present invention, the correlation coefficient represents a correlation between a transform coefficient of an original block and a transform coefficient of a prediction block.

In the present invention, the scaling coefficient represents a value that minimizes a difference between a transform coefficient of an original block and a transform coefficient of a prediction block.

In the present invention, the correlation coefficient or the scaling coefficient is determined based on at least one of a sequence, a block size, a frame, or a prediction mode.

In the present invention, the correlation coefficient or the scaling coefficient is a predetermined value or information transmitted from an encoder.

In the present invention, the method further comprises extracting a residual signal for the current block from the video signal; performing an entropy decoding on the residual signal; and performing an dequantization on the entropy decoded residual signal, wherein the residual block represents the dequantized residual signal.

The present invention provides a method for encoding a video signal comprising determining an optimal inter prediction mode for a current block; generating two non-square prediction blocks using two motion vectors according to the optimal inter prediction mode; performing a transform on the current block and the two non-square prediction blocks; determining an optimal correlation coefficient or an optimal scaling coefficient based on two non-square prediction blocks on a frequency domain; and updating the two non-square prediction blocks of the frequency domain using the optimal correlation coefficient or the optimal scaling coefficient.

In the present invention, the method further comprises generating a residual signal using the transformed current block and the two updated non-square prediction blocks on the frequency domain; performing a quantization on the residual signal; and performing an entropy encoding on the quantized residual signal.

The present invention provides a device for decoding a video signal comprising a parsing unit configured to extract an inter prediction mode of a current block from the video signal; a prediction unit configured to generate two non-square prediction blocks using two motion vectors according to the inter prediction mode; a transform unit configured to perform a non-square transform on the two non-square prediction blocks and obtain two non-square prediction blocks on a frequency domain; a correlation coefficient application unit configured to update the two non-square prediction blocks on the frequency domain using a correlation coefficient or a scaling coefficient; and a reconstruction unit configured to generate a reconstruction block based on the updated non-square prediction blocks on the frequency domain and a residual block.

The present invention provides a device for encoding a video signal comprising a prediction unit configured to determine an optimal inter prediction mode for a current block and generate two non-square prediction blocks using two motion vectors according to the optimal inter prediction mode; a transform unit configured to perform a transform on the current block and the two non-square prediction blocks; and a correlation coefficient application unit configured to determine an optimal correlation coefficient or an optimal scaling coefficient based on the two non-square prediction blocks in a frequency domain and update two non-square prediction blocks on the frequency domain using the optimal correlation coefficient or the optimal scaling coefficient.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185 and an entropy encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy encoding unit 190. The entropy encoding unit 190 may entropy-code the quantized signal and then output the entropy-coded signal as bitstreams.

The quantized signal output from the quantization unit 130 may be used to generate a prediction signal. For example, the quantized signal may be respectively subjected to dequantization and an inverse transform via the dequantization unit 140 and the inverse transform unit 150 in the loop to reconstruct a residual signal. The reconstructed residual signal may be added to the prediction signal output from the inter-prediction unit 180 or the intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and dequantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter-prediction unit 180 or the intra-prediction unit 185 may be used to generate the reconstructed signal or used to generate the residual signal.

The present invention provides a prediction method in a transform domain (or a frequency domain). Namely, the present invention can transform both an original block and a prediction block into a frequency domain by performing a transform on the two blocks. Furthermore, the present invention can generate a residual block in the frequency domain by multiplying a coefficient that minimizes residual energy for respective transform coefficients in the frequency domain, thereby reducing energy of the residual block and increasing compression efficiency.

The present invention provides a method for performing a prediction using a spatial correlation coefficient between a transform coefficient of an original block and a transform coefficient of a prediction block or a scaling coefficient minimizing a prediction error of a frequency component. This is described in embodiments of the specification in more detail below.

Figure 2:
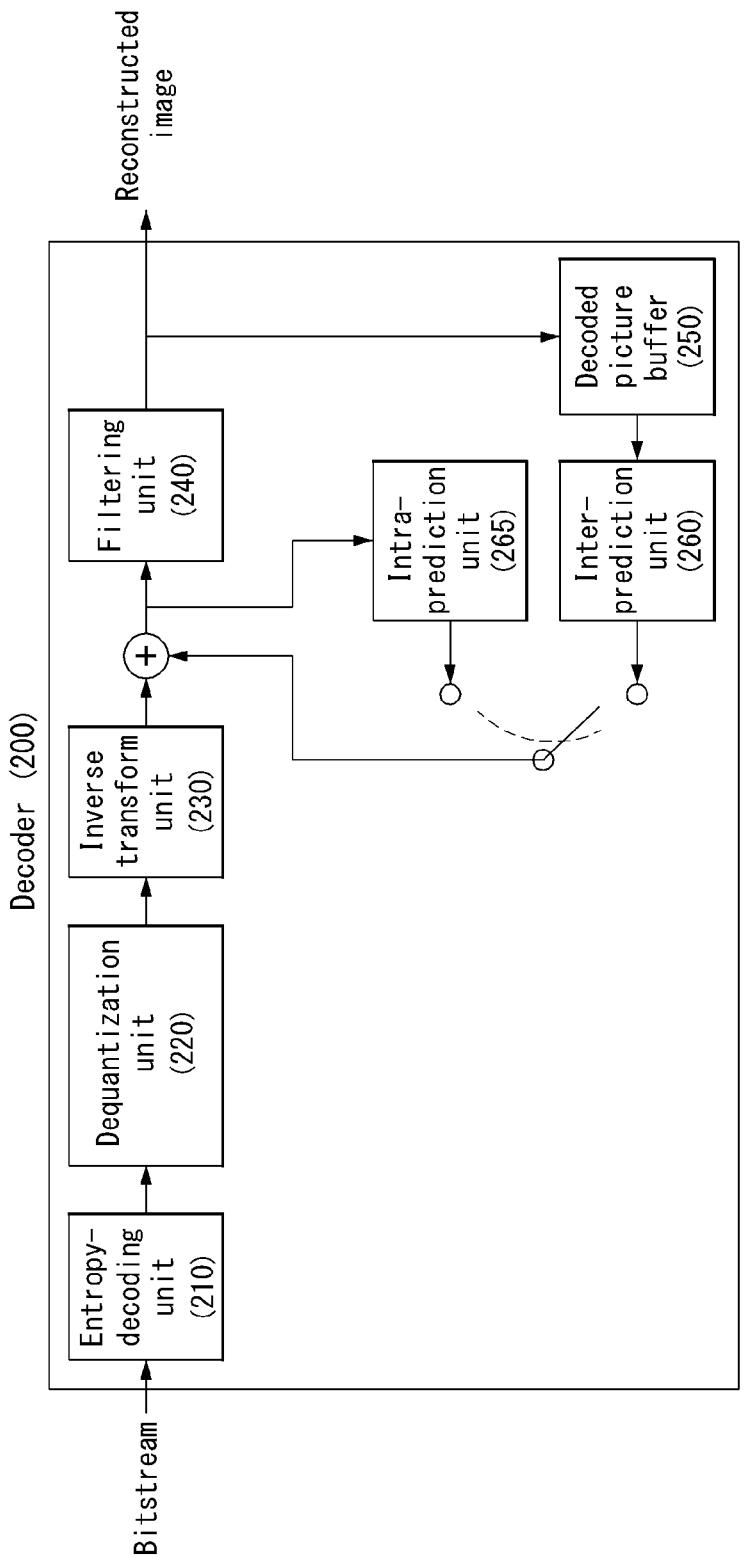
FIG. 2 is a block diagram illustrating a configuration of a decoder for decoding a video signal according to an embodiment of the present invention.

FIG. 2 shows a schematic block diagram of a decoder for decoding a video signal, in accordance with one embodiment of the present invention.

Referring to FIG. 2, a decoder 200 may include an entropy decoding unit 210, a dequantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy decoding unit 210.

The dequantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3(b), CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3(b), CU(c), CU(h), and CU(i) corresponding to nodes c, h, and I are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3(b), CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

Figure 4:
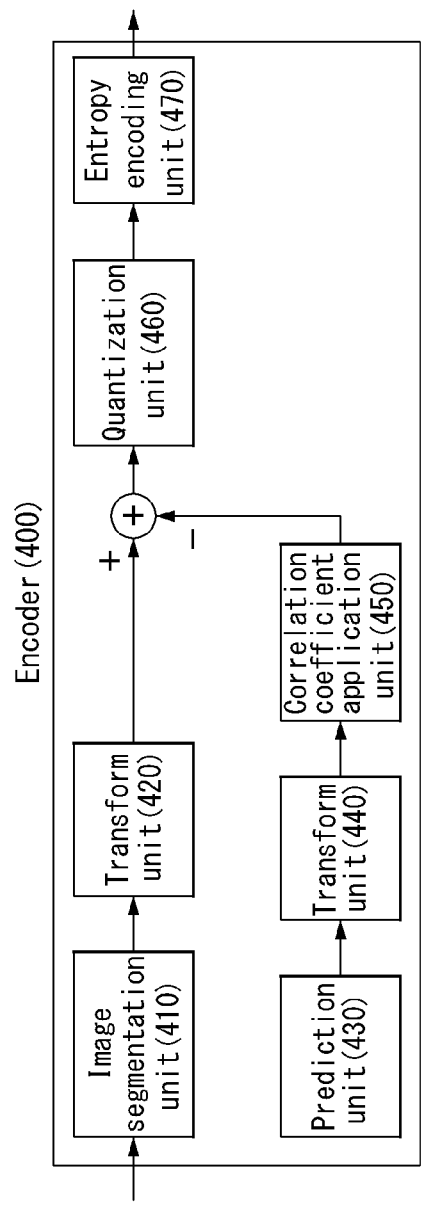
FIGS. 4 and 5 illustrate schematic block diagrams of an encoder and a decoder performing a transform domain prediction, as embodiments to which the present invention is applied.
Figure 5:
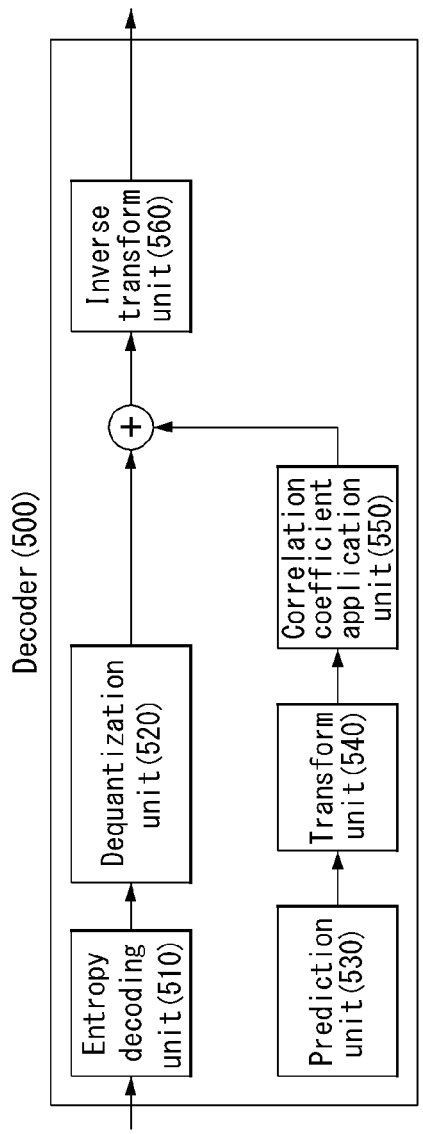

FIGS. 4 and 5 illustrate schematic block diagrams of an encoder and a decoder performing a transform domain prediction, as embodiments to which the present invention is applied.

One embodiment of the present invention provides a method for regenerating a prediction block in a frequency domain using a correlation coefficient. Here, the correlation coefficient means a value representing a correlation between a transform coefficient of an original block and a transform coefficient of a prediction block. For example, the correlation coefficient may mean a value representing how similar the transform coefficient of the prediction block is to the transform coefficient of the original block. Namely, the correlation coefficient may be represented by a ratio of the transform coefficient of the prediction block to the transform coefficient of the original block. As a specific example, if the correlation coefficient is 1, it may mean that the transform coefficient of the original block and the transform coefficient of the prediction block are equal to each other, and as the correlation coefficient is close to zero, it may mean that the similarity is reduced. In addition, the correlation coefficient may have positive (+) and negative (−) values.

Instead of expression of regeneration, terms such as filtering, updating, changing, and modifying may be replaced and used.

One embodiment of the present invention also provides a method for regenerating a prediction block in a frequency domain using a scaling coefficient. Here, the scaling coefficient means a value that minimizes a prediction effort between a transform coefficient of an original block and a transform coefficient of a prediction block. The scaling coefficient may be represented as a matrix.

Other embodiments of the present invention can select and use a more efficient one in terms of RD by comparing the case of using the correlation coefficient with the case of using the scaling coefficient in the encoder/decoder.

FIG. 4 illustrates a schematic block diagram of an encoder performing a transform domain prediction, and an encoder 400 includes an image segmentation unit 410, a transform unit 420, a prediction unit 430, a transform unit 440, a correlation coefficient acquisition unit 450, an adder/subtractor, a quantization unit 460, and an entropy encoding unit 470. The descriptions of the units given in connection with the encoder of FIG. 1 may be applied to the functional units of FIG. 4. Thus, only parts necessary to describe embodiments of the present invention are described below.

Other embodiments of the present invention provide a prediction method in a transform domain (or a frequency domain).

Other embodiments can transform both an original block and a prediction block into a frequency domain by performing a transform on the two blocks. Furthermore, other embodiments can generate a residual block in the frequency domain by multiplying a coefficient that minimizes residual energy for respective transform coefficients in the frequency domain, thereby reducing energy of the residual block and increasing compression efficiency.

First, the transform unit 420 may perform a transform on a current block of an original image. Furthermore, the prediction unit 430 may perform intra-prediction or inter-prediction and generate a prediction block. The prediction block may be transformed into a frequency domain through the transform unit 440. Here, the prediction block may be an intra-prediction block or an inter-prediction block.

The correlation coefficient application unit 450 may regenerate a prediction block in a frequency domain by applying a correlation coefficient or a scaling coefficient and may minimize a difference between the regenerated prediction block and a current block. In this instance, if the prediction block is the intra-prediction block, the correlation coefficient may be defined as a spatial correlation coefficient. If the prediction block is the inter-prediction block, the correlation coefficient may be defined as a temporal correlation coefficient. For another example, the correlation coefficient may be a predetermined value in the encoder, or the obtained correlation coefficient may be encoded and transmitted to a decoder. For example, the correlation coefficient may be determined through online or offline training before performing the encoding and may be stored in a table. If the correlation coefficient is a predetermined value, the correlation coefficient may be induced from a storage of the encoder or an external storage.

The correlation coefficient application unit 450 may filter or regenerate the prediction block using the correlation coefficient. A function of the correlation coefficient application unit 450 may be included in or replaced by a filtering unit (not shown) or a regeneration unit (not shown).

An optimal prediction block may be obtained by filtering or regenerating the prediction block. The subtractor may generate a residual block by subtracting the optimal prediction block from the transformed current block.

The residual block may be quantized via the quantization unit 460 and may be entropy-encoded via the entropy encoding unit 470.

FIG. 5 illustrates a schematic block diagram of a decoder performing a transform domain prediction, and a decoder 500 includes an entropy decoding unit 510, a dequantization unit 520, a prediction unit 530, a transform unit 540, a correlation coefficient acquisition unit 550, an adder/subtractor, and an inverse transform unit 560. The descriptions of the units given in connection with the decoder of FIG. 2 may be applied to the functional units of FIG. 5. Thus, only parts necessary to describe embodiments of the present invention are described below.

The prediction unit 530 may perform intra-prediction or inter-prediction and generate a prediction block. The prediction block may be transformed into a frequency domain through the transform unit 540. Here, the prediction block may be an intra-prediction block or an inter-prediction block.

The correlation coefficient application unit 550 may filter or regenerate the transformed prediction block using a predetermined correlation coefficient or a correlation coefficient transmitted by the encoder. For example, the correlation coefficient may be determined through online or offline training before performing the encoding and may be stored in a table. If the correlation coefficient is a predetermined value, the correlation coefficient may be induced from a storage of the decoder or an external storage.

A function of the correlation coefficient application unit 550 may be included in or replaced by a filtering unit (not shown) or a regeneration unit (not shown).

A residual signal extracted from a bitstream may be obtained as a residual block on a transform domain via the entropy decoding unit 510 and the dequantization unit 520.

The adder may reconstruct a transform block by adding the filtered prediction block and the residual block on the transform domain. The inverse transform unit 560 may obtain a reconstruction image by inverse-transforming the reconstructed transform block.

Figure 6:
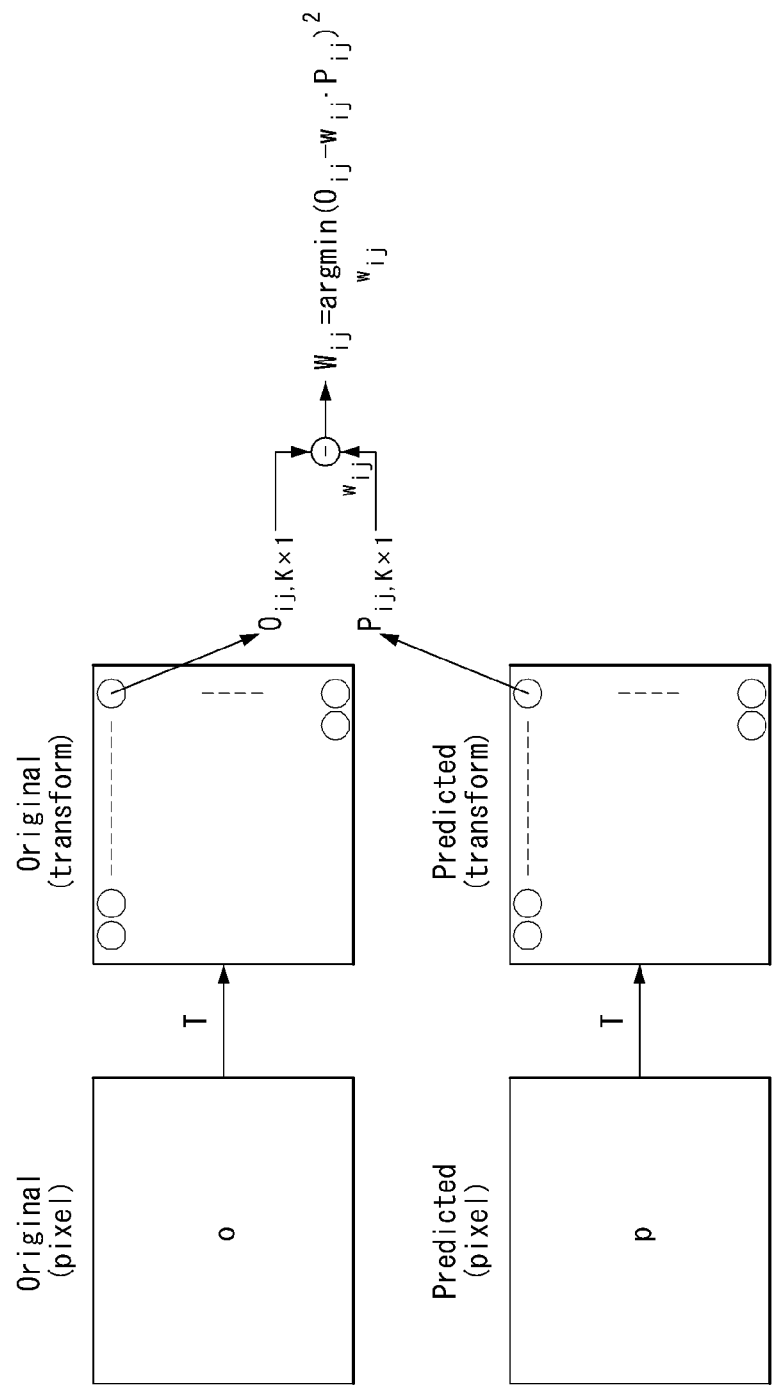
FIG. 6 illustrates a process for calculating a scaling coefficient or a correlation coefficient when performing a prediction in a transform domain region, as an embodiment to which the present invention is applied.

FIG. 6 illustrates a process for calculating a scaling coefficient or a correlation coefficient when performing a prediction in a transform domain region, as an embodiment to which the present invention is applied.

First, an original image (o) of a pixel domain and a prediction image (p) of the pixel domain each may be transformed into a frequency domain using a transform kernel. In this instance, a transform coefficient may be obtained by applying the same transform kernel T to the original image (o) and the prediction image (p). Examples of the transform kernel T may include DCT (Discrete Cosine Transform) (type I-VIII), DST (Discrete Sine Transform) (type I-VIII) or KLT (Karhunen-Loève Transform).

A scaling coefficient may be calculated to minimize residual energy for each coefficient of each frequency. The scaling coefficient may be calculated for each frequency coefficient and may be obtained by a least squares method as in the following Equation 1.

$$w_{ij} = (P_{ij}^T P_{ij})^{-1} P_{ij}^T O_{ij} \quad \text{[Equation 1]}$$

Here, $W_{ij}$ denotes a scaling coefficient for an ij-th transform coefficient of a transform block, $P_{ij}$ denotes an ij-th transform coefficient of a prediction block, and $O_{ij}$ denotes an ij-th transform coefficient of an original block.

In other embodiments of the present invention, a correlation coefficient considering a correlation between respective frequencies of the original block and the prediction block may be calculated using the following Equation 2.

$$\rho_{ij} = \frac{\text{cov}(P_{ij}, O_{ij})}{\sigma_{P_{ij}} \sigma_{O_{ij}}} = \frac{E[P_{ij}O_{ij}] - E[P_{ij}]E[O_{ij}]}{\sqrt{E[P_{ij}^2] - E[P_{ij}]^2} \sqrt{E[O_{ij}^2] - E[O_{ij}]^2}} \quad \text{[Equation 2]}$$

Here, $\rho_{ij}$ denotes a correlation between a transform coefficient of the original block and a transform coefficient of the prediction block at an ij-th frequency location. And, cov( ) function denotes covariance, and $\sigma_{P_{ij}}$ rp, $\sigma_{O_{ij}}$ respectively denote standard deviations of transform coefficients of ij-th located prediction block and original block. E[ ] is an operator that represent an expectation. For example, when Pearson product-moment correlation coefficient is used to calculate a sample correlation coefficient of n data sets $\{X_1, X_2, \ldots, X_n\}$ and $\{Y_1, Y_2, \ldots, Y_n\}$, it may be calculated using the following Equation 3.

$$r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}, \text{ where,} \quad [\text{Equation 3}]$$

$$\bar{x} = \frac{1}{n}\sum_{i=1}^{n}x_i, \bar{y} = \frac{1}{n}\sum_{i=1}^{n}y_i$$

Here, $r_{xy}$ denotes a sample correlation coefficient between two data sets. The n data sets $\{X_1, X_2, \ldots, X_n\}$ or $\{Y_1, Y_2, \ldots, Y_n\}$ may mean all of video sequence, but the present invention is not limited thereto. The data set may mean at least one of a part of the video sequence, a frame, a block, a coding unit, a transform unit, or a prediction unit.

The encoder may filter or regenerate a prediction block on a transform domain by obtaining a scaling coefficient or a correlation coefficient for each frequency and then applying it to a transform coefficient of the prediction block.

A residual signal on the transform domain may be generated by calculating a difference between a transform coefficient of an original block on the transform domain and the filtered or regenerated transform coefficient of the prediction block on the transform domain. The residual signal thus generated is encoded via the quantization unit and the entropy encoding unit.

The decoder may obtain a residual signal on a transform domain via the entropy decoding unit and the dequantization unit from the transmitted bitstream. A prediction block on the transform domain may be filtered or regenerated by performing a transform on the prediction block generated through the prediction unit and multiplying the same correlation coefficient (p) or scaling coefficient (w) as that used in the encoder.

A reconstruction block on the transform domain may be generated by adding the filtered or regenerated prediction block and the obtained residual signal on the transform domain. An image on a pixel domain may be reconstructed by performing an inverse transform through the inverse transform unit In other embodiments of the present invention, the scaling coefficient or the correlation coefficient may be defined based on at least one of a sequence, a block size, a frame, or a prediction mode.

In other embodiments of the present invention, the correlation coefficient may have different values depending on the prediction mode. For example, in case of intra-prediction, the correlation coefficient may have different values depending on an intra-prediction mode. In this case, the correlation coefficient may be determined based on spatial directionality of the intra-prediction mode.

In other embodiments, in case of inter-prediction, the correlation coefficient may have different values depending on an inter-prediction mode. In this case, the correlation coefficient may be determined based on temporal dependency of transform coefficients according to a motion trajectory.

In other embodiments, after prediction modes are classified through training and statistics, the correlation coefficient may be mapped to each classification group.

In other embodiments, the correlation coefficient application unit 450/550 may update the correlation coefficient or the scaling coefficient. The order or the position, in which the correlation coefficient or the scaling coefficient is updated, may be changed, and the present invention is not limited thereto. For example, in FIGS. 1 and 2 and FIGS. 4 and 5, if the correlation coefficient is updated, a reconstruction image to which the correlation coefficient or the scaling coefficient is applied may be stored in a buffer and may be used again for future prediction.

The prediction unit of the decoder may generate a more accurate prediction block based on the updated correlation coefficient or scaling coefficient, and hence, a finally generated residual block may be quantized via the quantization unit and may be entropy-encoded via the entropy encoding unit.

Figure 7:
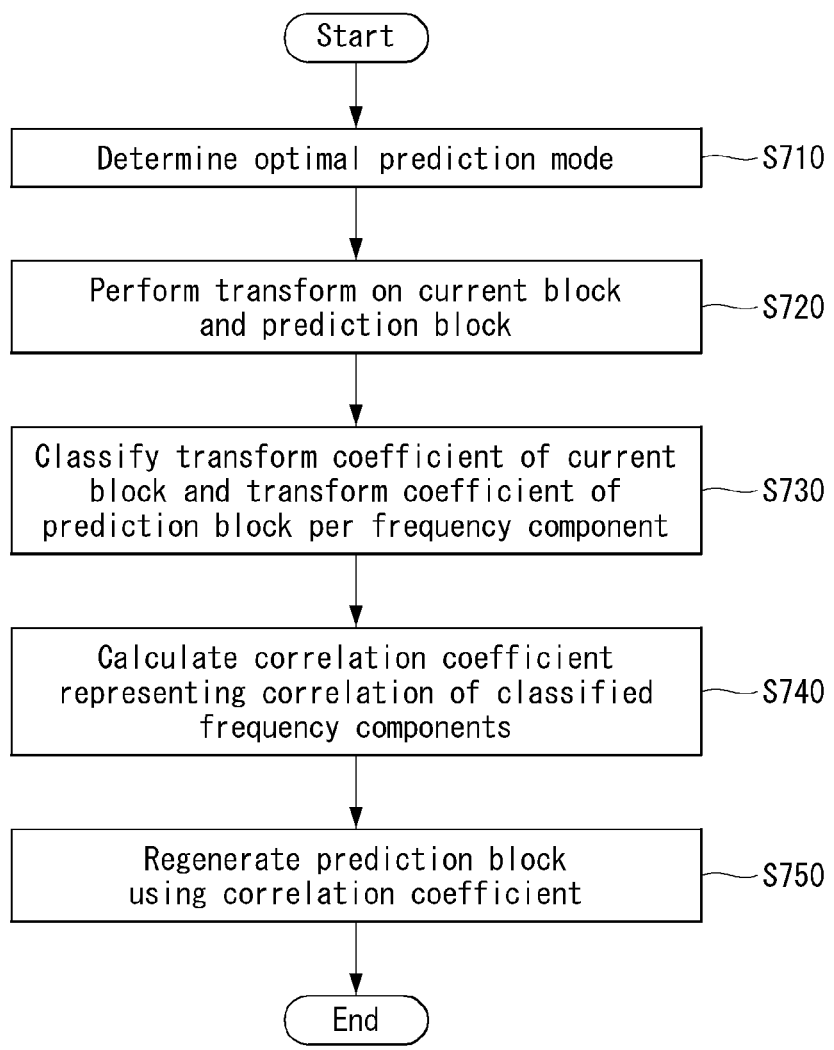
FIG. 7 is a flow chart of generating a correlation coefficient in consideration of a correlation between respective frequency components of an original block and a prediction block and applying the correlation coefficient to regenerate a prediction block, as an embodiment to which the present invention is applied.

FIG. 7 is a flow chart of generating a correlation coefficient in consideration of a correlation between respective frequency components of an original block and a prediction block and applying the correlation coefficient to regenerate a prediction block, as an embodiment to which the present invention is applied.

The present embodiment proposes a method for generating a correlation coefficient (p) in consideration of a correlation between respective frequency components of an original block and a prediction block. FIG. 7 illustrates a flow chart of obtaining a correlation coefficient and regenerating a prediction block using the correlation coefficient.

First, an encoder may determine an optimal prediction mode in S710. Here, the prediction mode may include an intra-prediction mode or an inter-prediction mode.

The encoder may generate a prediction block using the optimal prediction mode and perform a transform on the prediction block and an original block in S720. This is to perform a prediction on a transform domain in consideration of a correlation between respective frequency components of the original block and the prediction block.

The encoder may classify each of a transform coefficient of the original block and a transform coefficient of the prediction block per frequency component in S730.

The encoder may calculate a correlation coefficient representing a correlation of the classified frequency components in S740. In this instance, the correlation coefficient may be calculated using the above Equation 2.

When the classified frequency components are n data sets $\{X_1, X_2, \ldots, X_n\}$ and $\{Y_1, Y_2, \ldots, Y_n\}$, Pearson product-moment correlation coefficient method may be used to measure a linear correlation between the two frequency components. For example, the above Equation 3 may be used.

The encoder may regenerate the prediction block using the correlation coefficient in S750. For example, the prediction block may be regenerated or filtered by multiplying the correlation coefficient by the transform coefficient of the prediction block.

In other embodiments, a process for calculating the correlation coefficient may obtain an optimal correlation coefficient by differently applying for each sequence and each quantization coefficient.

Other embodiments, to which the present invention is applied, propose a method for obtaining a scaling coefficient that minimizes an error between respective frequency components of an original block and a prediction block. A process for obtaining a scaling coefficient in the present embodiments may apply the process illustrated in FIG. 7, and the correlation coefficient illustrated in FIG. 7 may be replaced by the scaling coefficient. Namely, the scaling coefficient may be calculated as a value that minimizes a square error between a transform block of the original image and a transform block of the prediction image.

As shown in FIG. 6, when the number of samples for an ij-th located frequency coefficient in each of a transform block of the original block and a transform block of the prediction block was K, a scaling coefficient $w_{ij}$ that minimizes a square error between $O_{ij,K\times1}$ and $P_{ij,K\times1}$ may be calculated using the above Equation 1. If a size of the block is N×N, a total of N×N scaling coefficients may be present.

The correlation coefficient or the scaling coefficient may be equally used for the encoder and the decoder. For example, the correlation coefficient or the scaling coefficient may be defined as a table in the encoder and the decoder and may be used as a predetermined value. Alternatively, the correlation coefficient or the scaling coefficient may be encoded and transmitted in the encoder.

In this instance, a method for using the table can save bits required to transmit the coefficient, and on the other hand, there may be a limit to maximizing the efficiency since the same coefficient is used in a sequence.

Further, a method for encoding and transmitting in the encoder may calculate an optimal number of the coefficients on a per picture basis or on a per block basis and may transmit the coefficients, thereby maximizing encoding efficiency.

Figure 8:
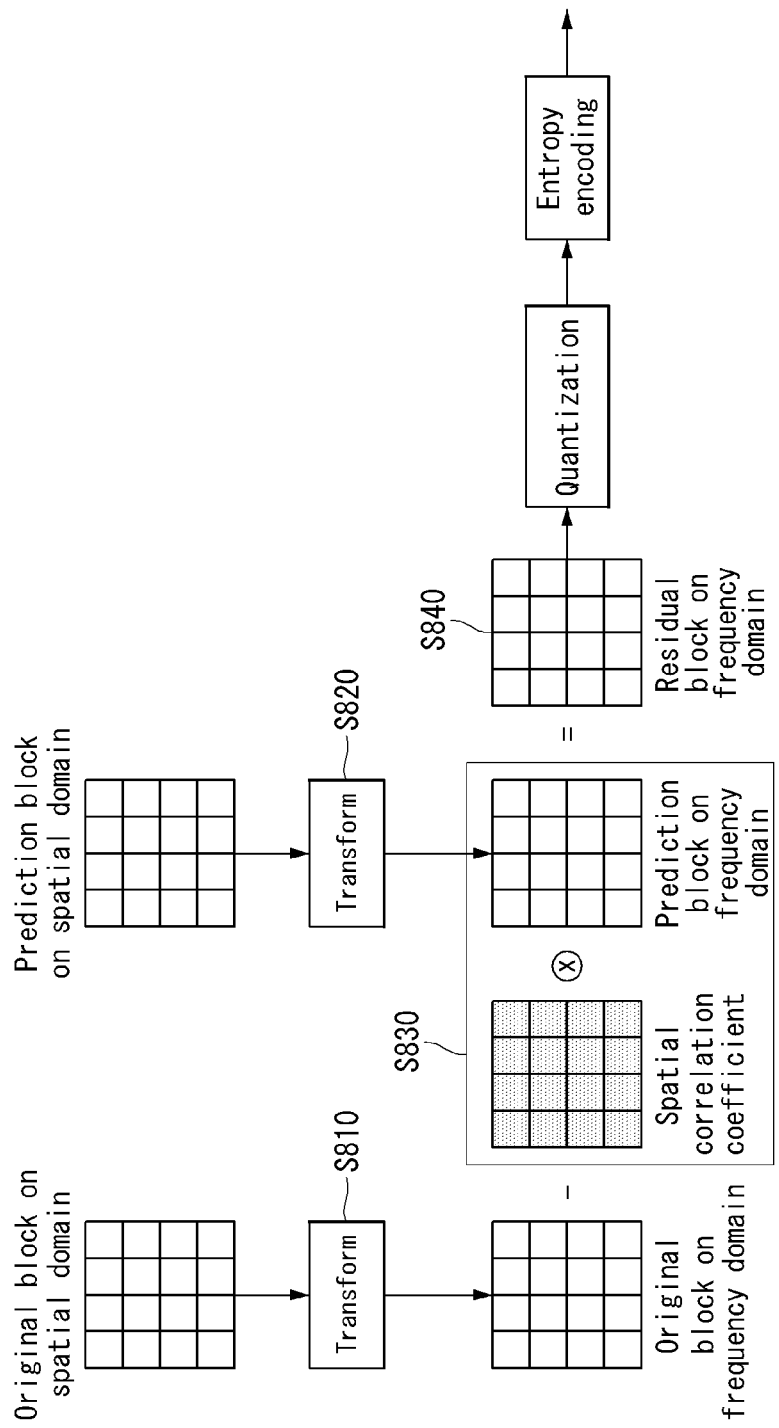
FIGS. 8 and 9 illustrate a method for applying a correlation coefficient or a scaling coefficient when respectively performing a transform domain prediction in an encoder or a decoder, as embodiments to which the present invention is applied.
Figure 9:
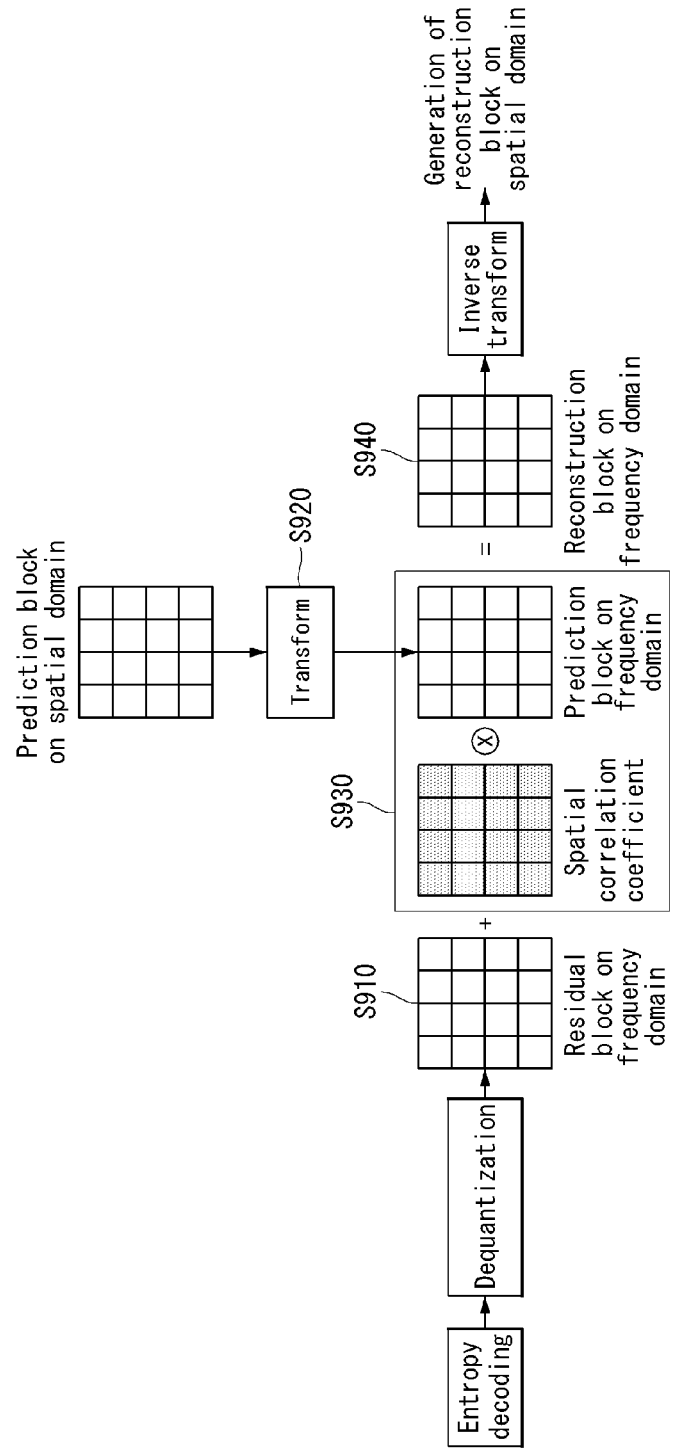

FIGS. 8 and 9 illustrate a process for performing a transform domain prediction, as embodiments to which the present invention is applied.

FIG. 8 illustrates an encoding process for performing a transform domain prediction.

Assuming that a current block in an original image is a 4×4 original block, a 4×4 original block on a frequency domain (or a transform domain) may be obtained by performing a transform on a 4×4 original block on a spatial domain in S810.

Further, a 4×4 prediction block on the spatial domain may be obtained according to a prediction mode, and a 4×4 prediction block on the frequency domain may be obtained by performing a transform on the 4×4 prediction block on the spatial domain in S820. Further, prediction accuracy can be improved by applying a correlation coefficient or a scaling coefficient to the 4×4 prediction block on the frequency domain in S830. Here, the correlation coefficient or the scaling coefficient may mean a value that minimizes a difference between the 4×4 original block on the frequency domain and the 4×4 prediction block on the frequency domain.

In other embodiments, the correlation coefficient may have different values depending on a prediction method. For example, if the prediction method is intra-prediction, the correlation coefficient may be called a spatial correlation coefficient. In this case, the spatial correlation coefficient may be determined based on spatial directionality of an intra-prediction mode. For another example, the correlation coefficient may have different values depending on an intra-prediction mode. For example, in case of a vertical mode and a horizontal mode, the correlation coefficient may have different values.

Further, if the prediction method is inter-prediction, the correlation coefficient may be called a temporal correlation coefficient. In this case, the temporal correlation coefficient may be determined based on temporal dependency of transform coefficients according to a motion trajectory.

A residual block on the frequency domain may be obtained by subtracting the 4×4 prediction block on the frequency domain from the 4×4 original block on the frequency domain in S840.

Thereafter, the residual block on the frequency domain may be quantized and entropy-encoded.

FIG. 9 illustrates a decoding process for performing a transform domain prediction.

A decoder may receive residual data from an encoder and may obtain a residual block on a frequency domain by performing entropy decoding and dequantization on the residual data in S910.

Further, the decoder may obtain a 4×4 prediction block on a spatial domain according to a prediction mode, and may obtain a 4×4 prediction block on the frequency domain by performing a transform on the 4×4 prediction block on the spatial domain in S920. Furthermore, the decoder can improve prediction accuracy by applying a correlation coefficient or a scaling coefficient to the 4×4 prediction block on the frequency domain in S930. Here, the correlation coefficient or the scaling coefficient may be a predetermined value or information transmitted by the encoder.

The decoder may obtain a reconstruction block in the frequency domain by adding the residual block on the frequency domain and the 4×4 prediction block on the frequency domain in S940.

The reconstruction block in the frequency domain may generate a reconstruction block in the spatial domain (or pixel domain) through an inverse transform process.

In FIGS. 8 and 9, ⊗ means an element by element product, and the same method as FIGS. 8 and 9 may be applied to blocks, for example, 8×8 and 16×16 blocks that are larger than the 4×4 block.

Figure 10:
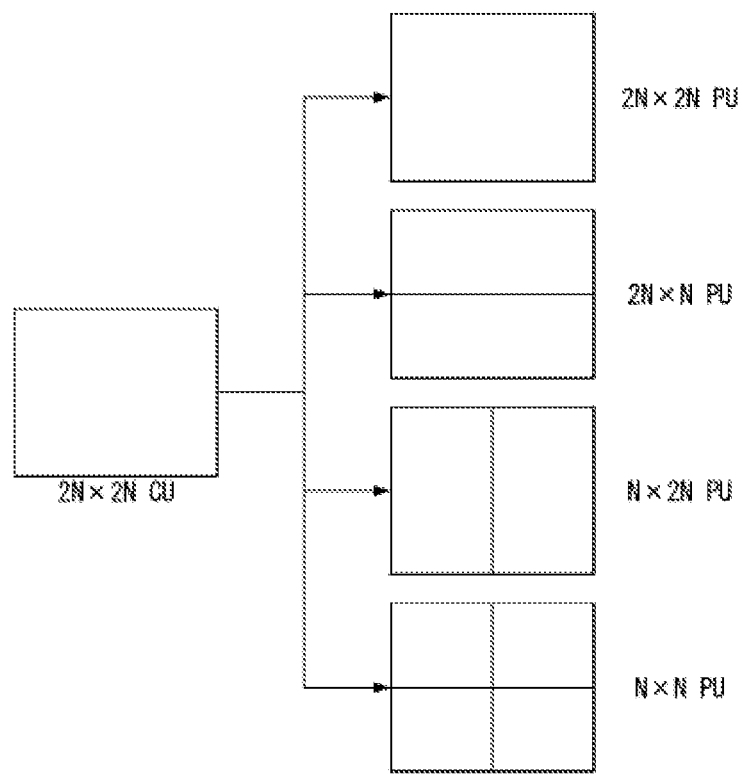
FIG. 10 illustrates that a 2N×2N coding unit (CU) in a video coding structure is split into various types of prediction units (PUs), as an embodiment to which the present invention is applied.

FIG. 10 illustrates that 2N×2N CU in a video coding structure is split into various types of PUs, as an embodiment to which the present invention is applied.

In a video coding structure to which the present invention is applied, a CU, a PU, and a TU may each perform an individual split so that they achieve an optimal performance. For example, as shown in FIG. 10, one 2N×2N CU may be split into various types of PUs such as 2N×2N, 2N×N, N×2N, and N×N.

The prediction in a frequency domain applies a transform to each of an original block and a prediction block, instead of applying a transform to a residual signal that is a difference between the original block and the prediction block, generates an original block of the frequency domain and a prediction block of the frequency domain, and calculates a residual signal, that is a difference between the two blocks, in the frequency domain.

In case of general video coding, quadtree split is performed on a residual signal of a spatial domain using a square transform of N×N, whereas a prediction method in the frequency domain performs a transform on each of an original block of the spatial domain and a prediction block of the spatial domain. Thus, when the prediction in the frequency domain is performed, it is difficult to apply the quadtree split to performing the transform. Further, when one CU is split into two PUs, each PU may have different correlation coefficients or different scaling coefficients. Therefore, the present invention intends to provide a transform domain prediction method suitable for this.

Figure 11:
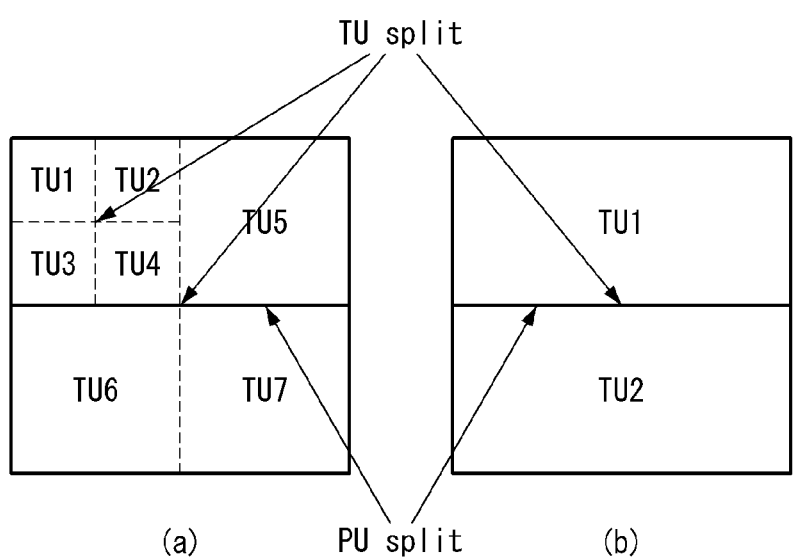
FIG. 11 illustrates a method for applying prediction unit (PU) split and transform unit (TU) split in a frequency domain, as an embodiment to which the present invention is applied.

FIG. 11 illustrates a method for applying PU split and TU split in a frequency domain, as an embodiment to which the present invention is applied.

An embodiment of the present invention proposes a method for applying a transform to each split prediction block when a prediction block is split. FIG. 11(a) illustrates a method for applying TU split when a PU is split into 2N×N, and FIG. 11(b) illustrates a method for applying TU split when a PU in video coding in a frequency domain is split into 2N×N.

It can be seen from FIG. 11(a) that the PU split and the TU split are performed independently. For example, the PU may be split into two 2N×N PUs, and the TU may be split into four N×N TUs regardless of the PU split and then a first N×N TU may be again split into four TUs TU1, TU2, TU3 and TU4.

On the other hand, referring to FIG. 11(b), in case of the coding in the frequency domain, since the transform is earlier performed, it is difficult to perform the TU split independently from the PU split. Thus, in this case, since it is difficult to apply the TU split, the present invention provides a method for applying a TU depending on a PU split type. For example, as shown in FIG. 11(b), if the PU is split into 2N×N type PUs, the TU may apply a non-square transform of the 2N×N type to each PU. For example, TU1 may be applied to the upper PU, and TU2 may be applied to the lower PU.

As another example, if the PU is split into N×2N type PUs, the TU may apply a non-square transform of the N×2N type to each PU.

If a TU of a type different from a PU type is applied, it may be difficult to efficiently perform the coding. For example, if a TU (e.g., DCT, DST, etc.) of 2N×N type is applied when the PU is N×2N, or if a TU of N×2N type is applied when the PU is 2N×N, it may be difficult to efficiently perform the coding. This is because residual information around a PU boundary is generally more than that in an area other than the PU boundary due to discontinuity generated at the PU boundary. Thus, for the efficient coding, the transform is applied not to include the PU boundary, or the TU split needs to be performed.

In other embodiments of the present invention, a graph-based transform (GBT) may be used to apply a TU of a type different from a PU type. Since the GBT generates transform kernel in consideration of a PU split boundary, the GBT may be adaptive to PU boundary information.

Accordingly, the present invention can use the non-square transform when applying the same TU type as a PU type, and can use the GBT when applying a TU type different from the PU type.

In other embodiments of the present invention, the TU split may not be performed when the video coding is performed in a frequency domain. For example, a non-square transform of the same type as a current PU type may be applied only to a current PU and may be performed. When the PU and the TU have the same type as described above and the TU split is not performed, the TU type may be determined depending on the PU type. In this case, split_transform_flag that is syntax related to the TU split may not be necessary. Thus, if the PU is 2N×N or N×2N when the video coding is performed in the frequency domain, syntax information related to the TU split does not need to be coded.

When the video coding is performed in the frequency domain of 2N×N or N×2N, an available transform may use various types of transforms such as DCT, DST, KLT, etc.

Figure 12:
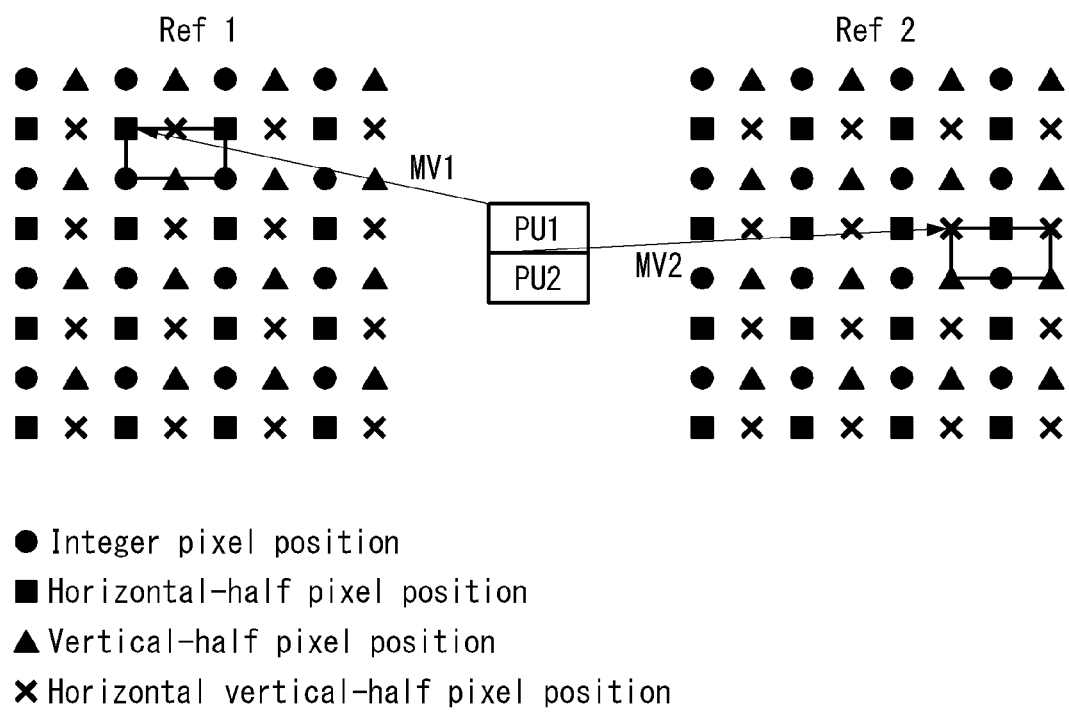
FIG. 12 illustrates that a split PU has a motion vector pointing to different subpixel positions, as an embodiment to which the present invention is applied.

FIG. 12 illustrates that a split PU has a motion vector pointing to different subpixel positions, as an embodiment to which the present invention is applied.

An embodiment of the present invention proposes a method for regenerating a prediction block in a frequency domain when the prediction block is split in a prediction process by reflecting a correlation between frequency coefficients or a coefficient minimizing an error of the prediction block. Properties of a correlation coefficient representing a correlation between frequency coefficients of an original block and a prediction block or properties of a scaling coefficient minimizing errors of the original block and the prediction block may vary depending on a position (integer pixel, subpixel) of a motion vector.

Referring to FIG. 12, it can be confirmed that a prediction block is split into PU1 and PU2, a motion vector MV1 of the PU1 points to a vertical half pixel position of a reference picture 1 Ref 1, and a motion vector MV2 of the PU2 points to a horizontal-vertical half pixel position of a reference picture 2 Ref 2.

When a value of a subpixel position is generated using an interpolation filter in a value of an integer pixel position for the purpose of motion interpolation of a half pixel position, a horizontal half pixel position and the vertical half pixel position may apply the interpolation filter once, and the horizontal-vertical half pixel position may apply the interpolation filter twice.

Since the interpolation filter is a low frequency filter, when a value of a subpixel position is generated using the interpolation filter, a frequency component of the generated value varies depending on the generated subpixel position. Thus, when the values of the subpixel positions are generated by changing the number of times of use of the interpolation filter depending on the subpixel position, properties of the frequency components of the values are different from each other.

A coding method in the frequency domain reflecting the characteristics of the interpolation filter may use different correlation coefficients or different scaling coefficients at the respective subpixel positions. For example, as shown in FIG. 12, when one CU is spilt into two PUs and each split PU has motion vectors pointing to different subpixel positions, a transform domain prediction can be performed using the correlation coefficients with different properties or the scaling coefficients with different properties.

As described above, each PU may have different motion vectors, and thus may have different correlation coefficients or different scaling coefficients.

Accordingly, the present invention can perform the transform domain prediction using the different correlation coefficients or the different scaling coefficients of each PU when the prediction block is split.

Figure 13:
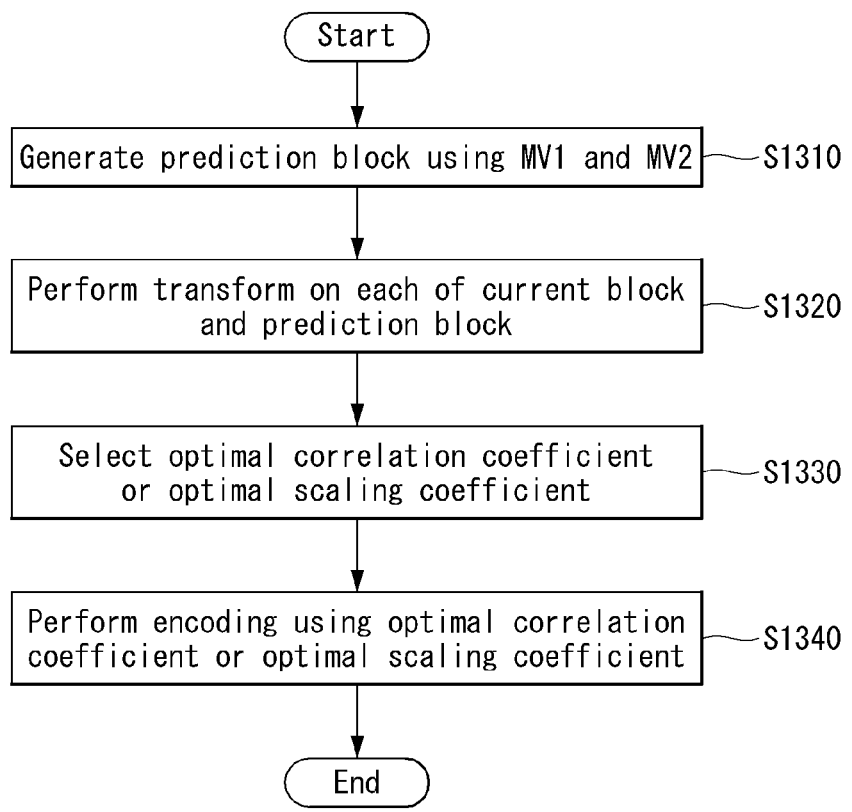
FIG. 13 is a flow chart illustrating a method for performing a prediction in a frequency domain when a split PU has a motion vector pointing to different subpixel positions, as an embodiment to which the present invention is applied.

FIG. 13 is a flow chart illustrating a method for performing a prediction in a frequency domain when a split PU has a motion vector pointing to different subpixel positions, as an embodiment to which the present invention is applied.

First, it is assumed that one CU is split into two PUs, and the split PUs each have motion vectors MV1 and MV2.

An encoder may generate a prediction block using the motion vectors MV1 and MV2 in S1310.

The encoder may perform a transform on each of a current block and a prediction block in S1320. For example, the encoder may apply a square transform to the current block and may apply a non-square transform to the prediction block. As a specific example, the encoder may generate a prediction block of a frequency domain by applying the non-square transform to respective PU blocks split into two PUs.

The encoder may apply correlation coefficients or scaling coefficients of subpixel positions, to which the motion vectors MV1 and MV2 of each PU block point, to the prediction block and may calculate a rate-distortion cost. In this instance, the prediction block may mean a prediction block of one frequency domain generated by combining the two PU blocks.

In one embodiment, a magnitude of the correlation coefficient or a magnitude of the scaling coefficient may be the same as a CU size. Further, the encoder may use forward and/or backward correlation coefficient or scaling coefficient according to a direction of the motion vector.

The encoder may determine an optimal correlation coefficient or an optimal scaling coefficient among two correlation coefficients or two scaling coefficients by performing a comparison in terms of the rate-distortion cost in S1330.

In one embodiment, the encoder may generate a new prediction block using a correlation coefficient C1 or a scaling coefficient W1 corresponding to the motion vector MV1 and may perform a comparison in terms of the rate-distortion cost using the new prediction block.

In one embodiment, the encoder may generate a new prediction block using a correlation coefficient C2 or a scaling coefficient W2 corresponding to the motion vector MV2 and may perform a comparison in terms of the rate-distortion cost using the new prediction block.

The encoder may apply a finally selected correlation coefficient or a finally selected scaling coefficient and may perform encoding in the frequency domain in S1340.

FIG. 14 illustrates syntax for signaling a correlation coefficient or a scaling coefficient when performing a transform domain prediction, as an embodiment to which the present invention is applied.

The present invention provides a method for performing a transform domain prediction using different correlation coefficients or different scaling coefficients in each PU when a prediction block is split.

In this case, an embodiment of the present invention provides various methods for signaling the correlation coefficients or the scaling coefficients.

As a first example, when a prediction block is split, flag information indicating which information is used among the correlation coefficients or the scaling coefficients corresponding to each PU may be defined. For example, the flag information may be referred to as coeff_flag in S1410, and the fact that coeff_flag value is zero may mean using a correlation coefficient C1 or a scaling coefficient W1 corresponding to a motion vector MV1 of a PU1, and the fact that the coeff_flag value is 1 may mean using a correlation coefficient C2 or a scaling coefficient W2 corresponding to a motion vector MV2 of a PU2.

As a second example, flag information indicating whether the correlation coefficient or the scaling coefficient is present may be defined. For example, when the flag information is 1, it indicates that the correlation coefficient or the scaling coefficient is present, and in this case, the correlation coefficient or the scaling coefficient may be induced. As a specific example, the correlation coefficient or the scaling coefficient may be determined through online training or offline training before the encoding is performed, and may be stored in a table. When the correlation coefficient or the scaling coefficient is a predetermined value, the correlation coefficient or the scaling coefficient may be induced from a storage in a decoder or an external storage.

The flag information may be defined in a prediction unit, and in this case, the decoder may determine which information is used among the correlation coefficients or the scaling coefficients corresponding to each PU by obtaining the flag information in each prediction unit.

As the correlation coefficient or the scaling coefficient obtained through this is applied to the prediction unit, the prediction unit may be regenerated or updated.

The decoder may reconstruct a video signal based on the regenerated or updated prediction unit.

FIG. 15 illustrates a method for generating an updated prediction block using two correlation coefficients or two scaling coefficients, as an embodiment to which the present invention is applied.

The present embodiment describes a method for performing a transform domain prediction using two correlation coefficients or two scaling coefficients.

For example, when a CU is split into 2N×N or N×2N type PUs, the present invention provides a method for generating a new prediction block using a correlation coefficient or a scaling coefficient of 2N×N or N×2N type.

As another example, the present invention may use forward and backward correlation coefficients or scaling coefficients according to a direction of a motion vector.

Referring to FIG. 15(a), it can be confirmed that a prediction block is split into PU1 and PU2, a motion vector MV1 of the PU1 points to a vertical half pixel position of a reference picture 1 Ref 1, and a motion vector MV2 of the PU2 points to a horizontal-vertical half pixel position of a reference picture 2 Ref 2.

That is, when a CU is split into two 2N×N PUs and the motion vectors MV1 and MV2 each have forward and backward motions, as shown in FIG. 15(b), a new prediction block in a frequency domain may be generated using a 2N×N backward scaling coefficient W1 and a 2N×N forward scaling coefficient W2 with respect to the motion vector MV1. For example, an updated PU1 may be obtained by scaling the 2N×N backward scaling coefficient W1 to an original PU1 block, and an updated PU2 may be obtained by scaling the 2N×N forward scaling coefficient W2 to an original PU2 block.

Further, a new prediction block in the frequency domain may be generated using a 2N×N backward correlation coefficient C1 and a 2N×N forward correlation coefficient C2 with respect to the motion vector MV1.

As described above, the present invention can perform a transform domain prediction based on the correlation coefficients and the scaling coefficients corresponding to each of the MV1 and the MV2 when one CU is split into two prediction units PU1 and PU2 and the MV1 and the MV2 of each prediction unit point to different positions. This is described in detail below.

Figure 16:
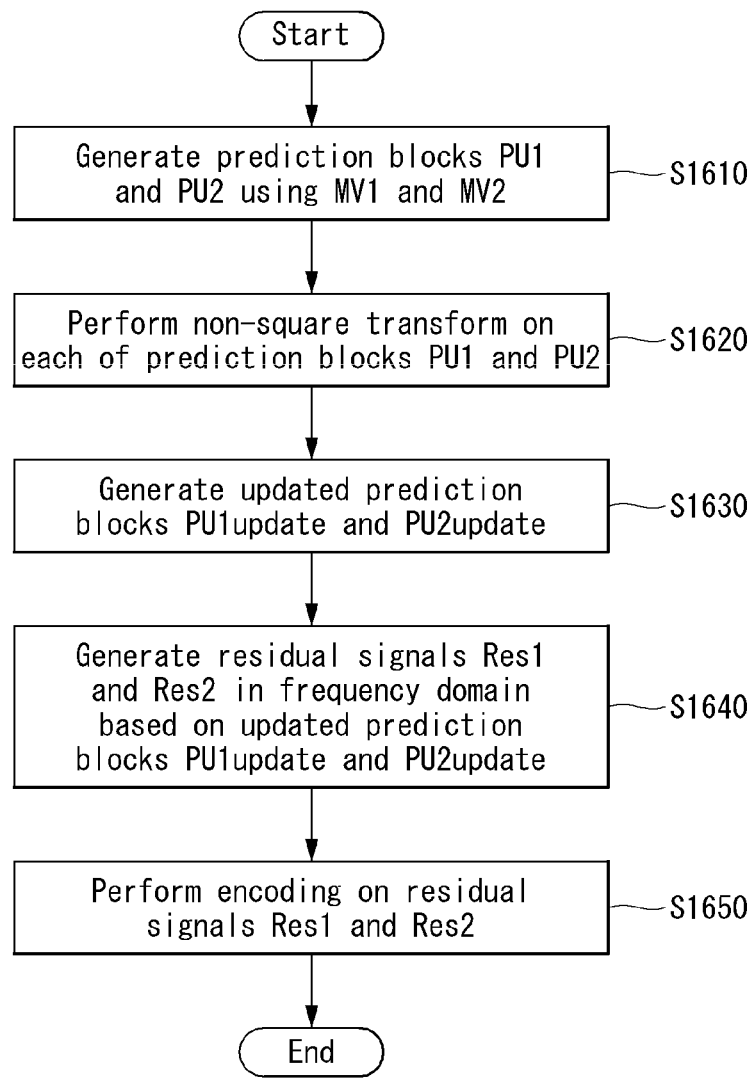
FIG. 16 is a flow chart illustrating a method for performing a transform domain prediction using two correlation coefficients or two scaling coefficients, as an embodiment to which the present invention is applied.

FIG. 16 is a flow chart illustrating a method for performing a transform domain prediction using two correlation coefficients or two scaling coefficients, as an embodiment to which the present invention is applied.

First, it is assumed that one CU is split into two PUs, and the split PUs each have motion vectors MV1 and MV2.

An encoder may generate prediction blocks PU1 and PU2 using the motion vectors MV1 and MV2 in S1610. In this case, the PU split may be determined as an optimal split. Further, the motion vectors MV1 and MV2 may be determined as optimal motion vectors with respect to the prediction blocks PU1 and PU2.

The encoder may perform a non-square transform on each of the prediction blocks PU1 and PU2 in S1620.

The encoder may generate updated prediction blocks $PU1_{update}$ and $PU2_{update}$ by applying a correlation coefficient or a scaling coefficient corresponding to each of the prediction blocks PU1 and PU2 to the prediction blocks PU1 and PU2 of a frequency domain in S1630.

The encoder may generate residual signals Res1 and Res2 in the frequency domain based on the updated prediction blocks $PU1_{update}$ and $PU2_{update}$ in S1640.

The encoder may perform quantization and entropy encoding on the residual signals Res1 and Res2 in S1650.

In one embodiment of the present invention, the above process may be similarly performed even in a decoder, and a different part of the above process will be mainly described below.

First, a decoder may receive a prediction mode from bitstream and obtain motion vector information when the prediction mode is an inter-prediction mode. Here, the inter-prediction mode may represent that one CU is split into two PUs and the split PUs each have motion vectors MV1 and MV2.

The decoder may generate prediction blocks PU1 and PU2 using the motion vectors MV1 and MV2.

The decoder may perform a non-square transform on each of the prediction blocks PU1 and PU2.

The decoder may generate updated prediction blocks $PU1_{update}$ and $PU2_{update}$ by applying a correlation coefficient or a scaling coefficient corresponding to each of the prediction blocks PU1 and PU2 to the prediction blocks PU1 and PU2 of a frequency domain. In this instance, the correlation coefficient or the scaling coefficient may be equally used in the encoder and the decoder. For example, the correlation coefficient or the scaling coefficient may be defined in a table in the encoder and the decoder and may use a predetermined value. Alternatively, the correlation coefficient or the scaling coefficient may be encoded in the encoder and transmitted.

The decoder may receive a residual signal from bitstream and may obtain a residual signal of the frequency domain through entropy decoding and dequantization on the residual signal.

The decoder may add the residual signal of the frequency domain and the updated prediction blocks $PU1_{update}$ and $PU2_{update}$ and perform an inverse transform on it to reconstruct a video signal.

Another embodiment of the present invention may provide a method for applying a correlation coefficient or a scaling coefficient in a quantization process.

First, an encoder may determine an optimal prediction mode. Here, the prediction mode may include an intra-prediction mode or an inter-prediction mode.

The encoder may generate a prediction block using the optimal prediction mode and may calculate a difference between an original block and the prediction block in a spatial domain (or pixel domain) to generate a residual block in the spatial domain.

The encoder may perform a transform on the residual block and perform quantization on the transformed residual block using a correlation coefficient or a scaling coefficient. In this instance, the correlation coefficient or the scaling coefficient may be applied to embodiments described in the present specification.

As described above, the encoder may perform a more adaptive quantization by using a quantization step size that is changed per frequency.

Another embodiment of the present invention may provide a method for applying a correlation coefficient or a scaling coefficient in a dequantization process.

A decoder receives a residual signal from an encoder and performs entropy decoding on the residual signal.

The decoder may perform dequantization on the entropy decoded residual signal using a correlation coefficient or a scaling coefficient. For example, the decoder may reconstruct a quantization coefficient based on a value obtained by multiplying a coefficient scale value LevelScale and the correlation coefficient or the scaling coefficient. Here, the correlation coefficient or the scaling coefficient may be applied to embodiments described in the present specification.

The decoder may obtain a residual block on a frequency domain by performing the dequantization and may obtain a residual block in a spatial domain by performing an inverse transform on the residual block.

The decoder may generate a reconstruction block in the spatial domain (or pixel domain) by adding the residual block of the spatial domain to a prediction block.

As described above, the embodiments described in the present invention may be implemented in a processor, a microprocessor, a controller or a chip and performed. For example, the functional units shown in FIGS. 1, 2, 4, and 5 may be implemented in a computer, a processor, a microprocessor, a controller or a chip and performed.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for decoding a video signal, comprising:

checking a prediction mode of a current block;

obtaining non-square prediction blocks for the current block based on the prediction mode;

performing a transform on the non-square prediction blocks to obtain non-square prediction blocks on a frequency domain;

updating the non-square prediction blocks on the frequency domain based on a correlation coefficient, wherein the correlation coefficient is determined based on a ratio of (i) a transform coefficient of a prediction block, among the non-square prediction blocks, on the frequency domain to (ii) a transform coefficient of an original block related to the current block; and reconstructing the current block based on the non-square prediction blocks on the frequency domain and a residual block.

2. The method of claim 1, wherein based on the prediction mode represents an intra prediction mode, the correlation coefficient is determined based on spatial directionality of the intra-prediction mode.

3. The method of claim 1, wherein based on the prediction mode represents an inter prediction mode, wherein the correlation coefficient is determined based on temporal dependency of transform coefficients according to a motion trajectory.

4. The method of claim 1, wherein the correlation coefficient has different values based on the prediction mode.

5. The method of claim 1, further comprising:

obtaining a correlation flag being information on whether the correlation coefficient is present.

6. The method of claim 1, wherein the correlation coefficient is determined based on at least one of a sequence, a block size, or a frame.

7. The method of claim 1, wherein the correlation coefficient is a predetermined value or information transmitted from an encoder.

8. The method of claim 1, further comprising:
obtaining residual data for the current block;
performing an entropy decoding on the residual data; and
performing an dequantization on the entropy decoded residual data,
wherein the residual block represents the dequantized residual data.

9. A method for encoding a video signal, comprising:
checking a prediction mode of a current block;
obtaining non-square prediction blocks for the current block based on the prediction mode;
performing a transform on the non-square prediction blocks and the current block;
determining a correlation coefficient based on a ratio of (i) a transform coefficient of a prediction block, among the non-square prediction blocks, on a frequency domain to (ii) a transform coefficient of an original block related to the current block;
updating the non-square prediction blocks on the frequency domain based on a correlation coefficient;
generating residual data of the current block based on the non-square prediction blocks; and
performing a quantization and an entropy-encoding the residual data.

10. A non-transitory decoder-readable storage medium storing encoded picture information generated by performing the steps of:
checking a prediction mode of a current block;
obtaining non-square prediction blocks for the current block based on the prediction mode;
performing a transform on the non-square prediction blocks and the current block;
determining a correlation coefficient based on a ratio of (i) a transform coefficient of a prediction block, among the non-square prediction blocks, on a frequency domain to (ii) a transform coefficient of an original block related to the current block;
updating the non-square prediction blocks on the frequency domain based on a correlation coefficient;
generating residual data of the current block based on the non-square prediction blocks; and
performing a quantization and an entropy-encoding the residual data.

* * * * *